United States Patent [19]
Miller

[11] Patent Number: 5,935,448
[45] Date of Patent: Aug. 10, 1999

[54] WATER PURIFICATION WITH IN SITU PRODUCTION OF DISPERSED FLOCCULANT

[76] Inventor: Jorge Miller, 3300 Sage Rd., Apt. 9204, Houston, Tex. 77056

[21] Appl. No.: 08/998,251

[22] Filed: Dec. 24, 1997

[51] Int. Cl.⁶ .................................................. C02F 1/54
[52] U.S. Cl. ...................... 210/705; 210/725; 210/728; 210/730; 210/738; 210/908
[58] Field of Search ................................ 210/704, 705, 210/716, 717, 725, 727, 728, 729, 730, 738, 908

[56] References Cited

U.S. PATENT DOCUMENTS

| | | | |
|---|---|---|---|
| 3,158,570 | 11/1964 | Duke | 210/912 |
| 3,203,968 | 8/1965 | Sebba | 210/912 |
| 3,404,088 | 10/1968 | Dujardin | 210/705 |
| 3,583,909 | 6/1971 | Block | 210/705 |
| 3,898,159 | 8/1975 | Okabe et al. | 210/705 |
| 4,054,516 | 10/1977 | Izumi et al. | 210/912 |
| 4,178,265 | 12/1979 | Malsuda et al. | 252/316 |
| 4,744,904 | 5/1988 | McAninch et al. | 210/632 |
| 4,802,991 | 2/1989 | Miller | 210/705 |
| 5,078,899 | 1/1992 | Garrison | 210/704 |
| 5,281,339 | 1/1994 | Mainwaring et al. | 210/705 |

*Primary Examiner*—Peter A. Hruskoci
*Attorney, Agent, or Firm*—Browning Bushman

[57] ABSTRACT

The present invention is directed to methods and apparatus for purifying water wherein a highly dispersed, hydrophobic flocculant is produced in situ. In the preferred methods, a dispersion of a water-insoluble, metallic soap is produced in situ by the reaction of an aqueous solution of a water-soluble, multivalent metal salt with an aqueous solution of a water-soluble, alkali soap. The apparatus of the present invention includes a first mixing chamber for producing in situ an aqueous dispersion of a hydrophobic flocculant. The apparatus further includes a second mixing chamber in fluid communication with the first chamber and a flocculation/separation basin. The hydrophobic flocculant is evenly dispersing within the contaminated water by introduction into the second chamber through a high pressure pump and sparger. As the hydrophobic flocculant forms in the flocculation/separation basin, it entrains other impurities, thus producing purified water which is withdrawn from the basin through a clean water outlet.

14 Claims, 1 Drawing Sheet

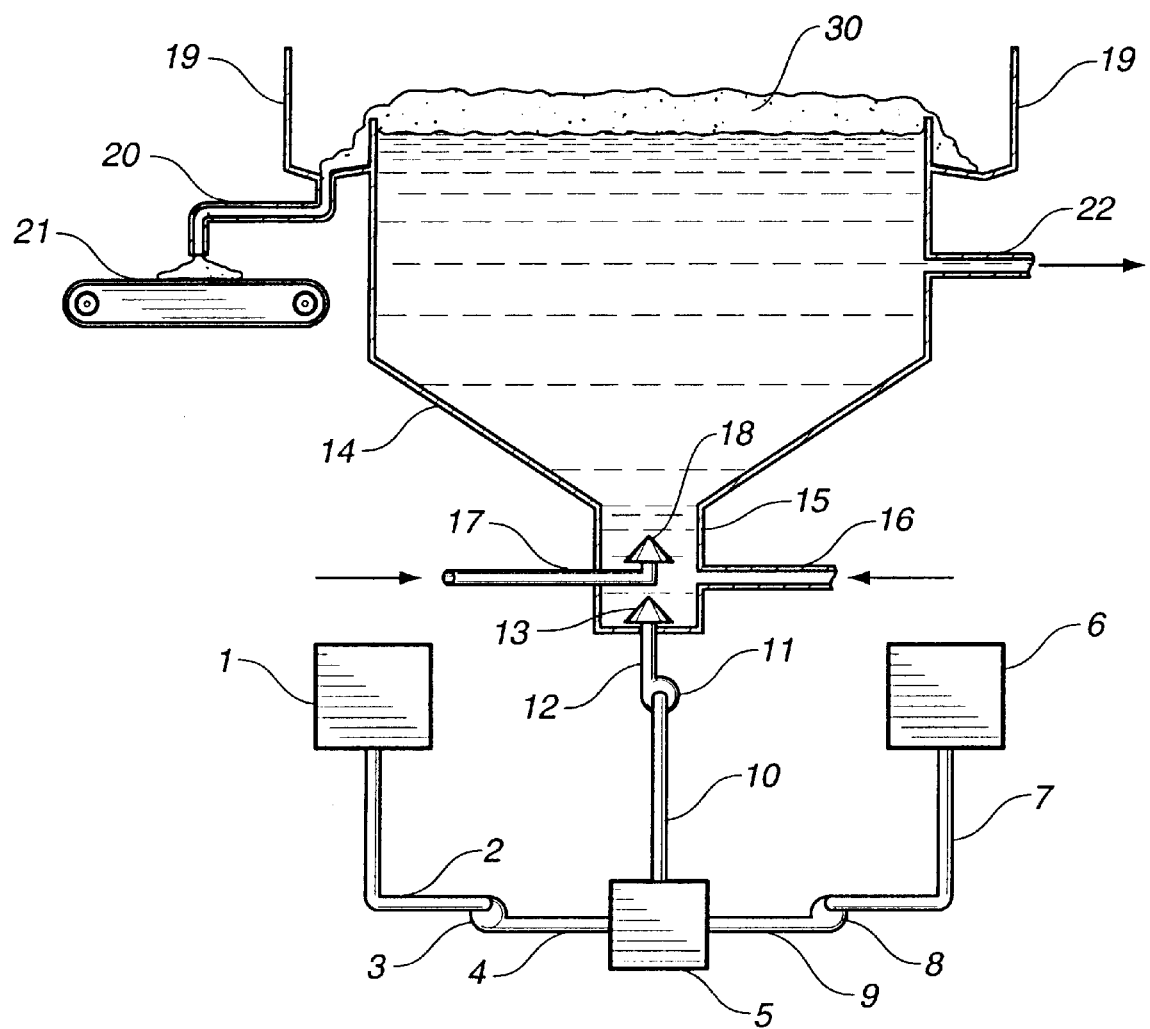

WATER PURIFICATION WITH IN SITU PRODUCTION OF DISPERSED FLOCCULANT

BACKGROUND OF THE INVENTION

I. Field of the Invention

The present invention generally relates to a process for purifying contaminated water and to an apparatus for performing that process. The present invention provides particularly suitable methods and apparatus for purifying waste water containing fatty acids. More specifically, the present invention is directed to methods and apparatus for purifying contaminated water, e.g., waters containing suspended organic colloidal emulsions or suspensions such as effluents from meat processing plants, dairies, cheese processing plants, bakeries, chemical plants and petroleum plants and effluents including raw sewage.

II. Description of the Background

Economical and efficient methods and apparatus for purifying contaminated water, particularly water containing fatty acids, have long been sought. Many industrial facilities, particularly facilities plagued with fatty acid wastes, have long sought improved methods for purifying waste water.

An exemplary method and apparatus for achieving the desired purification were disclosed in U.S. Pat. No. 4,802,991 by Miller. The '991 patent illustrated and described a method of water purification wherein fatty acids contaminating the water are combined with metallic ions released from electrodes during electrolysis to form hydrophobic, metallic soaps. According to the process described by Miller, bivalent or trivalent metal ions released from electrodes during electrolysis combine with the fatty acids to form an insoluble flocculant. The flocculent, in turn, entrained or absorbed other impurities present in the contaminated water. Thus, the flocculant served as a transport medium to remove not only fatty acids, but also other impurities from the water.

In order to ensure continuous production of ions, the electrodes in the apparatus disclosed by Miller were disposed in a moving bed of solid particles. Those solid particles were kept in motion by the flow of process water through the electrolysis chamber in order to continuously abrade and clean the electrode surfaces. The flocculant and entrained impurities were directed to a flocculation/separation basin where the flocculant and entrained impurities were separated by flotation, leaving purified water for withdrawal from the basin.

The method and apparatus described by Miller in the '991 patent, while technically elegant, have found only limited use. Systems employing iron electrodes, while functional, proved unacceptable due to the difficulty in removing ferrous hydroxide from the purified water. Systems employing aluminum electrodes were found to be uneconomical due to the high cost for both electrodes and labor incurred for replacement of spent electrodes. Accordingly, use of the method and apparatus disclosed in the '991 patent was restricted to applications where other methods were cost prohibitive.

Thus, the water purification industry has continued to seek new and improved methods for removing fatty acids and other contaminants from water. Accordingly, there has been a long-felt but unfulfilled need for more economical, more efficient and more convenient methods for purifying water, particularly water contaminated with fatty acids and other contaminants. The present invention solves those needs.

SUMMARY OF THE INVENTION

The present invention is directed to methods and apparatus for the in situ production of highly dispersed, hydrophobic flocculants. The methods of the present invention are particularly suitable for the in situ production of highly dispersed, water-insoluble, metallic soaps. These hydrophobic flocculants, particularly the metallic soaps, provide excellent means for entrapping or entraining other impurities and contaminants in a waste water being treated. Accordingly, methods using these flocculants produced in situ can conveniently be used to produce clean, purified water.

In the methods of the present invention, the desired metallic soaps are prepared in situ by the reaction of an aqueous solution of a water-soluble, multivalent metal salt with an aqueous solution of a water-soluble, alkali soap. While many multivalent metals will produce a suitable hydrophobic flocculant, multivalent metals that are heavier than sodium should be used. More preferred are aluminum, the alkaline earths and the transition metals. Most preferred are aluminum, calcium, magnesium and iron.

The water-soluble, alkali soap may be selected from any of the conventional alkali soaps. Conventional soaps have been made from many carboxyl-containing components, including rosin, tall oil, vegetable oils, animal oils and fats. Exemplary soaps include the ammonium and alkali metal soaps of the fatty acids. Preferred are the alkali soaps of fatty acids. More preferred are the ammonium, sodium and potassium salts of soaps formed from carboxylic acids having about 8 to about 22 carbon atoms. Most preferred are the sodium salts of $C_{16}$ to $C_{18}$ carboxylic acids.

In the preferred embodiments, the multivalent metal salt and alkali soap are mixed in an approximately stoichiometric ratio. It has also been found desirable to maintain the pH of the aqueous dispersion of hydrophobic flocculant in the range of about 6.5 to about 8.5.

A system for performing the methods of the present invention comprises a first mixing chamber for receiving an aqueous solution of a water-soluble, multivalent, metal salt and an aqueous solution of a water-soluble, alkali soap from separate inlets. In a preferred embodiment, high pressure pumps deliver those aqueous solutions from appropriate receiving or holding vessels into the mixing chamber at a velocity sufficiently high to produce turbulent mixing of the solution so that no additional mixing apparatus is required. The hydrophobic flocculant produced in situ is immediately delivered via another high pressure pump from the chamber into a second mixing chamber where it is dispersed throughout contaminated water entering the second chamber. Dispersing and mixing is conveniently achieved by use of a simple, high pressure pump and sparger without requiring additional mixing equipment. An alternative embodiment further includes means for injecting air into the second chamber to improve the dispersion and coagulation of the hydrophobic flocculant.

The system further includes a conventional flocculation/separation basin in fluid communication with the second mixing chamber. The volume of this basin is much larger than the volume of the second mixing chamber so that the velocity of water in the basin is greatly reduced. The reduced velocity facilitates the formation of large flocculant particles which entrap other impurities. As the flocculant forms and entraps other impurities, it rises to the top of the basin. The basin includes a trough or other conventional means about the periphery of its top to remove the floating flocculant and entrained impurities. Flocculant and entrained impurities are removed from the surface of the flocculation basin and diverted to a conventional filtration system for recovery. Finally, the system includes a clean water outlet for withdrawing purified water from the flocculation/separation basin.

Thus, the long felt, but unfulfilled need for more economical and more efficient methods and apparatus for purifying water contaminated with fatty acids and other impurities has been met. These and other meritorious features and advantages of the present invention will be more fully appreciated from the following description and claims.

BRIEF DESCRIPTION OF THE DRAWINGS

Other features and intended advantages of the present invention will be more readily apparent by reference to the following detailed description in connection with the accompanying drawing, wherein:

the FIGURE is a schematic representation of a water purification system incorporating the methods of the present invention in order to produce in situ a highly dispersed, hydrophobic flocculant.

While the invention will be described in connection with the presently preferred embodiment, it will be understood that it is not intended to limit the invention to that embodiment. On the contrary, it is intended to cover all alternatives, modifications and equivalents as may be included in the spirit of the invention as defined in the appended claims.

DETAILED DESCRIPTION OF THE PREFERRED EMBODIMENTS

The present invention provides more efficient, more economical methods and apparatus for purifying contaminated water. In the methods of the present invention, an aqueous dispersion of a hydrophobic flocculant is prepared in situ to coagulate and entrap impurities, thus, producing purified water.

In the methods of the present invention a water-soluble, multivalent, metal salt is mixed with an aqueous solution of a water-soluble, alkali soap to produce a hydrophobic flocculant. The hydrophobic flocculant is preferably a metallic soap.

In the preferred methods of the present invention an aqueous solution of a water-soluble, multivalent metal salt is mixed with an aqueous solution of a water-soluble, alkali soap to produce in situ an aqueous dispersion of a water-insoluble, metallic soap. The multivalent metal should be heavier than sodium and is preferably selected from the group consisting of aluminum, the alkaline earths and the transition metals. More preferably, the metal is selected from the group consisting of aluminum, calcium, magnesium and iron. The anion of the salt may be any non-interfering, environmentally acceptable anion, e.g., chloride, nitrate or sulfate.

The water-soluble, alkali soap is selected from any conventional soap having a carboxyl group. These soaps are typically formed as the reaction product of a fatty acid ester and an alkali, usually sodium hydroxide. Substances from which these soaps are commonly formed include rosin, tall oil, vegetable oils, animal oils and fats. Exemplary soaps are prepared from carboxylic acids having from about 8 to about 22 carbon atoms. Particularly preferred are the $C_{16}$ to $C_{18}$ carboxylic acids, e.g., stearic, palmitic and oleic acids. The cation in these soaps is preferably selected from the group consisting of ammonium and the alkali metals, particularly sodium and potassium. Most preferably, the alkali metal is sodium.

While the multivalent metal salt and alkali soap may be reacted in any desired ratio, in the preferred methods they are reacted in approximately a stoichiometric ratio. If, however, the contaminated water includes excessive fatty acids, it may be desirable to provide an excess of the water-soluble, multivalent metal salt to react with the fatty acid contaminants to produce additional water-insoluble, metallic soaps.

The present invention performs best when the pH of the aqueous dispersion of hydrophobic flocculant is maintained from about 6.5 to about 8.5.

While any conventional means may be employed for mixing the components, mixing is most economically provided by the turbulence created by injection of the aqueous component solutions into the mixing chamber. This turbulence is achieved by delivering the solutions to the mixing chamber using conventional, high pressure pumps producing a high flow velocity.

Apparatus for purifying contaminated water in accord with the methods of the present invention generally comprises a mixing chamber having first and second inlets for delivering to the chamber, respectively, an aqueous solution of a first water-soluble component and an aqueous solution of a second water-soluble component which components, when mixed, form a hydrophobic flocculant. The apparatus further comprises a flocculation/separation tank having an inlet for contaminated water and an inlet in fluid communication with the mixing chamber for receiving an aqueous dispersion of the hydrophobic flocculant. The flocculation/separation tank is typically divided into two chambers. The tank includes a lower, mixing chamber of relatively small volume wherein the aqueous dispersion of hydrophobic flocculant is mixed with contaminated water so that the hydrophobic flocculant produced in situ is highly dispersed throughout the waste water. The tank further comprises a second, separation basin having a much larger volume than the mixing chamber to facilitate coagulation of the flocculant and entrapment of additional impurities. As the water and dispersed flocculant move into this separation basin the flow velocity is significantly reduced. As a result of the lower flow, the flocculent, preferably a water-insoluble, metallic soap, coagulates, entrapping other impurities in the water. The flocculant and entrapped impurities float to the surface of the separation basin where they are removed by any conventional means.

The method of the present invention will now be described in connection with a presently preferred apparatus illustrated in the accompanying FIGURE.

An aqueous solution of a first water-soluble component, e.g., a water-soluble, multivalent metal salt, is maintained in vessel 1 while an aqueous solution of a second water-soluble component, e.g., a water-soluble, alkali soap is maintained in vessel 6. These solutions are drawn from vessels 1 and 6, respectively, for mixing in a first mixing vessel 5. In the presently preferred embodiment, the solution of the first, water-soluble component is withdrawn from vessel 1 through line 2 and injected into first mixing vessel 5 through pump 3 and line 4. Similarly, the solution of the second, water-soluble component is withdrawn from tank 6 through line 7 for injection into first mixing chamber 5 through pump 8 and line 9.

Sufficient mixing of the solutions in vessel 5 to produce in situ the desired hydrophobic flocculant can be achieved by the turbulence created by high pressure pumps 3 and 8. Thus, in the preferred embodiment no additional mixing means are required. However, in an alternative embodiment, the apparatus may include any conventional mixing means, e.g., rotating paddles or the like, disposed in mixing vessel 5.

In the methods of the present invention the hydrophobic flocculent, preferably a water-insoluble, metallic soap, is formed in situ in mixing vessel 5. The aqueous solution of hydrophobic flocculent formed in mixing vessel 5 is withdrawn through line 10 and high pressure injection pump 11 for delivery via line 12 and sparger 13 to a second mixing chamber 15 at the bottom of a flocculation/separation basin 14. High pressure pump 11 and sparger 13 ensure an even dispersion of hydrophobic flocculent within the contaminated water which is delivered to second mixing chamber 15 via inlet 16. Optionally, the apparatus of the present invention may include line 17 terminating in sparger 18 disposed preferably above sparger 13 for introducing pressurized air to mixing chamber 15.

Directly above mixing chamber 15 is a conventional flocculation/separation basin 14 having a lower, conical portion expanding upwardly into an upper, cylindrical portion. Water and dispersed flocculant pass upwardly from mixing chamber 15 into flocculation/separation basin 14 where reduced flow velocity facilitates coagulation of the flocculant and entrapment of additional impurities. The contaminants are thus entrained in the flocculent, producing purified water.

The insoluble, hydrophobic flocculant, preferably the metallic soap produced in situ, floats to the surface 30, together with entrained impurities, where it is removed by any conventional means. In the illustrated embodiment, the top of flocculation/separation basin 14 is surrounded by a peripheral channel 19. Channel 19 is designed to receive floating flocculant 30 and entrapped impurities rising to the surface of the water within flocculation basin 14. Channel 19 is connected by a discharge line 20 to an appropriate filter, e.g., textile fabric filter 21, where the hydrophobic flocculant and entrapped impurities are separated for disposal.

Purified water is withdrawn from an appropriate line, e.g., clean water line 22, disposed below the surface of flocculation/separation basin 14.

The foregoing description has been directed in primary part to a particular preferred embodiment in accordance with the requirements of the Patent Statutes and for purposes of explanation and illustration. It will be apparent, however, to those skilled in the art that many modifications and changes in the specifically described methods and apparatus may be made without departing from the true spirit and scope of the invention. For example, the aqueous dispersion of hydrophobic flocculant might be produced in transfer line 12 by introducing the aqueous component solutions directly into pump 11 for turbulent mixing in line 12. Therefore, the invention is not restricted to the preferred embodiment described and illustrated, but covers all modifications which may fall within the scope of the following claims.

What is claimed is:

1. A method for purifying contaminated water containing impurities including fatty acids, comprising:

admixing an aqueous solution of a water-soluble, multivalent metal salt and an aqueous solution of a water-soluble, alkali soap in a first mixing chamber to produce in situ an aqueous dispersion of a water-insoluble soap of said multivalent metal;

directing said aqueous dispersion to a second mixing chamber where said water-insoluble soap is evenly dispersed throughout said contaminated water;

forming a hydrophobic flocculant comprising said water-insoluble soap which entraps said impurities in a flocculation/separation chamber;

separating said flocculant from purified water in said flocculation/separation chamber; and recovering said purified water.

2. The method of claim 1 wherein said multivalent metal is selected from the group consisting of aluminum, the alkaline earths and the transition metals.

3. The method of claim 1 wherein said alkali soap is selected from the group consisting of the ammonium and alkali metal salts of fatty acids.

4. The method of claim 1 wherein said metal is selected from the group consisting of aluminum, calcium, magnesium and iron.

5. The method of claim 4 wherein said alkali soap is selected from the group consisting of the ammonium, sodium and potassium salts of carboxylic acids having about 8 to about 22 carbon atoms.

6. The method of claim 5 wherein said acids are selected from the group consisting of stearic, palmitic and oleic acid.

7. The method of claim 1 wherein the pH of said aqueous dispersion is about 6.5 to about 8.5.

8. The method of claim 1 wherein said multivalent metal salt and said alkali soap are mixed in about a stoichiometric ratio.

9. The method of claim 1 further comprising blowing air into said second mixing chamber.

10. The method of claim 1 wherein said aqueous dispersion is produced by turbulence resulting from the introduction of said aqueous solution into said mixing chamber.

11. A method for purifying contaminated water containing impurities including fatty acids, comprising:

producing in situ an aqueous dispersion of a hydrophobic flocculant by mixing an aqueous solution of a water-soluble multivalent metal salt and an aqueous solution of a water-soluble alkali soap to form an aqueous dispersion of a water-insoluble soap of said multivalent material;

mixing said aqueous dispersion with said contaminated water so that said impurities become entrained in said hydrophobic flocculant to produce purified water;

separating said hydrophobic flocculant and entrained impurities from said purified water; and recovering said purified water.

12. The method of claim 11 wherein said multivalent metal is selected from the group consisting of aluminum, the alkaline earths and the transition metals.

13. The method of claim 11 wherein said alkali soap is selected from the group consisting of the ammonium and alkali metal salts of $C_8$ to $C_{22}$ carboxylic acids.

14. The method of claim 11 wherein said multivalent metal salt and said alkali soap are mixed in about a stoichiometric ratio.

* * * * *